(12) United States Patent
Gagliardi et al.

(10) Patent No.: US 10,148,738 B2
(45) Date of Patent: Dec. 4, 2018

(54) SYSTEM AND METHOD FOR EQUITABLE PROCESSING OF ASYNCHRONOUS MESSAGES IN A MULTI-TENANT PLATFORM

(71) Applicant: Zuora, Inc., San Mateo, CA (US)

(72) Inventors: Marco Gagliardi, Brisbane, CA (US); Marc Aronson, Cupertino, CA (US); Pushkala Pattabhiraman, Fremont, CA (US); Dmitri Medvedev, Belmont, CA (US); Levon Stepanian, San Mateo, CA (US)

(73) Assignee: Zuora, Inc., San Mateo, CA (US)

( * ) Notice: Subject to any disclaimer, the term of this patent is extended or adjusted under 35 U.S.C. 154(b) by 272 days.

(21) Appl. No.: 14/936,516

(22) Filed: Nov. 9, 2015

(65) Prior Publication Data
US 2016/0134573 A1    May 12, 2016

Related U.S. Application Data

(60) Provisional application No. 62/078,846, filed on Nov. 12, 2014.

(51) Int. Cl.
*G06F 15/16* (2006.01)
*H04L 29/08* (2006.01)
*H04L 12/58* (2006.01)

(52) U.S. Cl.
CPC .............. *H04L 67/10* (2013.01); *H04L 51/26* (2013.01)

(58) Field of Classification Search
CPC .................. H04L 67/10; H04L 51/26

USPC ......................................................... 709/204
See application file for complete search history.

(56) References Cited

U.S. PATENT DOCUMENTS

| | | | |
|---|---|---|---|
| 9,081,805 B1* | 7/2015 | Stamen | G06F 17/30297 |
| 9,678,789 B2* | 6/2017 | Meijer | G06F 9/466 |
| 9,749,428 B2* | 8/2017 | Lawson | H04L 65/403 |
| 2002/0194251 A1* | 12/2002 | Richter | G06F 9/5011 718/105 |
| 2003/0046396 A1* | 3/2003 | Richter | G06F 9/505 709/226 |
| 2010/0235495 A1* | 9/2010 | Petersen | H04L 63/1458 709/224 |
| 2011/0246434 A1* | 10/2011 | Cheenath | G06F 17/3038 707/703 |
| 2011/0258630 A1* | 10/2011 | Fee | G06F 9/4843 718/101 |
| 2012/0066020 A1* | 3/2012 | Moon | G06Q 10/0635 705/7.28 |

(Continued)

*Primary Examiner* — Imad Hussain
(74) *Attorney, Agent, or Firm* — Sheppard, Mullin, Richter & Hampton LLP

(57) ABSTRACT

Systems, methods and media are shown for equitable job processing of asynchronous messages for multiple tenants in a multi-tenant platform that involve receiving messages of a given message type in an input buffer from at least one front end tier (FET) device, providing messages of the given message type from an output buffer to at least one back end tier (BET) device, determining a priority weight W for each message in the input buffer based on a tenant identifier and message type for the message, and evaluating the priority weight W for the message and delaying the message if the priority weight W is below a priority threshold and moving the message to the output buffer if the priority weight W is not below the priority threshold.

20 Claims, 11 Drawing Sheets

(56) References Cited

U.S. PATENT DOCUMENTS

| | | | | |
|---|---|---|---|---|
| 2012/0159514 A1* | 6/2012 | Sigalov | .................... | G06F 9/546 |
| | | | | 719/314 |
| 2013/0275987 A1* | 10/2013 | Meijer | .................... | G06F 9/466 |
| | | | | 718/103 |
| 2014/0071290 A1* | 3/2014 | Collen | .................... | H04N 9/79 |
| | | | | 348/159 |
| 2014/0075446 A1* | 3/2014 | Wang | ........................ | G06F 9/50 |
| | | | | 718/104 |
| 2014/0358620 A1* | 12/2014 | Krebs | .............. | G06Q 10/06315 |
| | | | | 705/7.25 |
| 2015/0046279 A1* | 2/2015 | Wang | .................... | G06F 9/5027 |
| | | | | 705/26.3 |
| 2015/0058484 A1* | 2/2015 | Mehta | .................... | H04L 67/10 |
| | | | | 709/225 |
| 2015/0178135 A1* | 6/2015 | Wang | .................... | G06F 9/5027 |
| | | | | 718/104 |
| 2015/0188782 A1* | 7/2015 | Carlin | .................... | G06F 9/5011 |
| | | | | 709/226 |
| 2016/0055042 A1* | 2/2016 | Kwong | .................... | G06F 9/546 |
| | | | | 719/314 |
| 2016/0112475 A1* | 4/2016 | Lawson | ................. | H04L 65/403 |
| | | | | 709/204 |
| 2016/0112521 A1* | 4/2016 | Lawson | .................. | H04L 67/16 |
| | | | | 709/227 |
| 2016/0117195 A1* | 4/2016 | Wang | ................ | G06F 17/30474 |
| | | | | 707/770 |
| 2016/0119246 A1* | 4/2016 | Wang | .................... | H04L 47/72 |
| | | | | 709/226 |
| 2016/0246528 A1* | 8/2016 | Colgrove | .............. | G06F 3/0622 |
| 2017/0235605 A1* | 8/2017 | Chaloupka | ............ | G06F 9/4881 |
| | | | | 718/103 |

* cited by examiner

SYSTEM AND METHOD FOR EQUITABLE PROCESSING OF ASYNCHRONOUS MESSAGES IN A MULTI-TENANT PLATFORM

CROSS REFERENCE TO RELATED APPLICATION

This application claims the benefit of U.S. Provisional Patent Appl. No. 62/078,846 for "System and Method for Equitable Processing of Asynchronous Messages in a Multi-Tenant Platform" filed Nov. 12, 2014, herein incorporated by reference in its entirety for all purposes.

BACKGROUND

This application includes the attached Appendix, which contains information that may provide further examples and/or details regarding one or more embodiments of the invention described herein. The entire contents of the Appendix are considered part of the present application and are incorporated herein in its entirety.

A multi-tenant platform may be operated by a service provider to provide support for cloud-based processing, data storage and business oriented applications to multiple tenants. As part of operating the platform, asynchronous messages relating to multiple tenants are typically received by the multi-tenant platform and are generally processed in the order that the messages are received or using resources that are previously assigned to each tenant. If one of the tenants has a high amount of requests coming in to the multi-tenant platform, e.g. a "noisy neighbor", other tenants may experience long wait times and degraded service because the messaging system is flooded with the noisy neighbors' messages.

Conventional approaches to job processing in a multi-tenant platform system do not adequately provide for equitable processing of messages for multiple tenants. Many systems rely on a fixed, but suboptimal, assignment of resources to tenants, where the resources assigned are determined in advance of the actual message traffic observed at multi-tenant platform for the multiple tenants. Other systems tend to be reactive in that they take corrective action after a high traffic event involving a noisy neighbor tenant. Some systems may throttle or suspend a noisy neighbor tenant, but fail to return the noisy tenant to normal processing status after the high traffic event has subsided.

SUMMARY

The terms "invention," "the invention," "this invention" and "the present invention" as used herein are intended to refer broadly to all of the subject matter described in this document and to the claims. Statements containing these terms should be understood not to limit the subject matter described herein or to limit the meaning or scope of the claims. Embodiments of the invention covered by this patent are defined by the claims and not by this summary. This summary is a high-level overview of various aspects of the invention and introduces some of the concepts that are further described in the Detailed Description section below. This summary is not intended to identify key, required, or essential features of the claimed subject matter, nor is it intended to be used in isolation to determine the scope of the claimed subject matter. The subject matter should be understood by reference to appropriate portions of the entire specification of this patent, to any or all drawings, and to each claim.

Embodiments of the invention are directed to systems, apparatuses, and methods for equitable job processing of asynchronous messages in a multi-tenant environment that dynamically responds in real-time to a high traffic event involving one or more of the tenants. Certain refinements of the invention are directed to dynamically updating tenant priority to determine the processing of messages for a given tenant. Certain other refinements of the invention are directed to dynamically determining a priority for messages that may be processed and those that will be delayed.

Examples of systems, methods and media are shown for equitable job processing of asynchronous messages for multiple tenants in a multi-tenant platform that involve receiving messages of a given message type in an input buffer from at least one front end tier (FET) device, providing messages of the given message type from an output buffer to at least one back end tier (BET) device, determining a priority weight W for each message in the input buffer based on a tenant identifier and message type for the message, and evaluating the priority weight W for the message and delaying the message if the priority weight W is below a priority threshold and moving the message to the output buffer if the priority weight W is not below the priority threshold. In a further refinement, delaying the message involves delaying the message by moving the message to the input buffer. In another refinement, delaying the message involves delaying the message by moving the message to a delayed buffer.

Yet another refinement includes checking a current backlog status, adjusting the priority threshold based on the current backlog status, and moving the message from the delayed buffer to the output buffer if the priority weight of the message is not less than the updated priority threshold. In a further refinement, delaying the message further involves moving the message to a rejected buffer if the priority weight W of the message is less than the priority threshold by a rejection threshold value and, in addition, checking an amount of message traffic for the tenant identifier and message type of the message, updating the priority weight W of the message based if the message traffic has changed, and moving the message from the rejected buffer to the delayed buffer if the updated priority weight W has increased for the message.

In still another refinement, determining a priority weight W for each message further involves updating the priority weight W based on a number of messages received for the tenant identifier and message type for the message.

Other objects and advantages of the present invention will be apparent to one of ordinary skill in the art upon review of the detailed description of the present invention and the included figures.

BRIEF DESCRIPTION OF THE DRAWINGS

Embodiments of the invention in accordance with the present disclosure will be described with reference to the drawings, in which.

Note that the same numbers are used throughout the disclosure and figures to reference like components and features.

DETAILED DESCRIPTION

Figure 1:
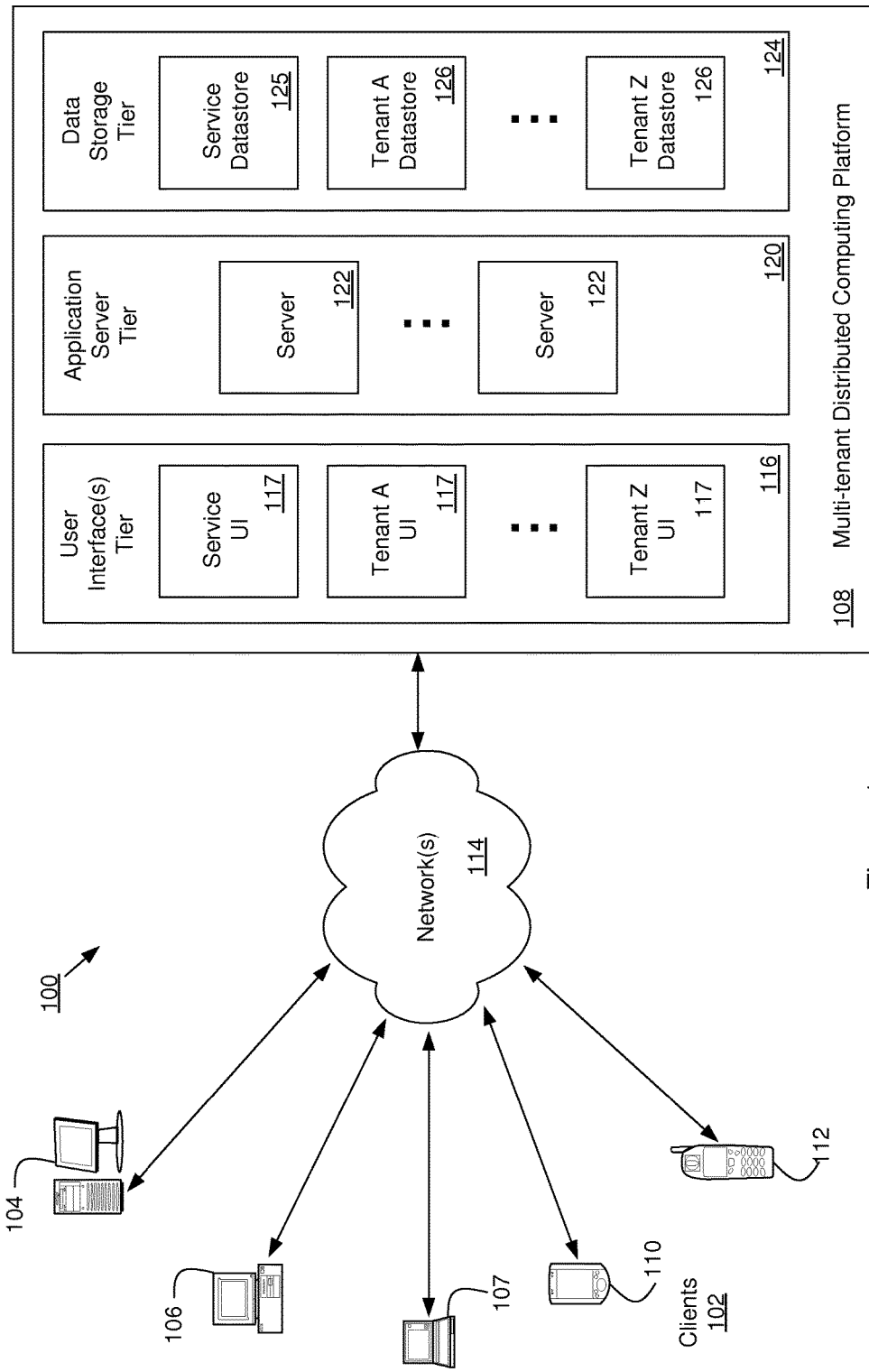
FIG. 1 is a diagram illustrating elements or components of an example operating environment (e.g., a Multi-tenant Distributed Computing Platform) with which an embodiment of the invention may be implemented.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention will be described more fully hereinafter with reference to the accompanying drawings, which form a part hereof, and which show, by way of illustration, exemplary embodiments by which the invention may be practiced. This invention may, however, be embodied in many different forms and should not be construed as limited to the embodiments set forth herein; rather, these embodiments are provided so that this disclosure will satisfy the statutory requirements and convey the scope of the invention to those skilled in the art.

Among other things, the present invention may be embodied in whole or in part as a system, as one or more methods, or as one or more devices. Embodiments of the invention may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, controller, etc.) that is part of a client device, server, network element, or other form of computing or data processing device/platform and that is programmed with a set of executable instructions (e.g., software instructions), where the instructions may be stored in a suitable data storage element. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

Embodiments of the present invention are directed to systems, apparatuses, and methods for equitably processing messages for multiple tenants in a multi-tenant service provider platform. In one embodiment, the invention includes a process or processes by which a multi-tenant platform determines the processing of a message received for one of multiple tenants on the basis of the tenant's priority. The tenant's priority is influenced by the number of messages received for the tenant so as to reduce the priority of a busy tenant in comparison to a less busy tenant so that the less busy tenant's message processing is not blocked by the volume of messages for the busy tenant.

As noted, in some embodiments, the invention may be implemented in the context of (or used with) a multi-tenant, "cloud" based environment (such as the example of a multi-tenant business data processing platform shown in FIG. 1), typically used to develop and provide services and business applications for end users. Note that embodiments of the invention may also be implemented in the context of other computing or operational environments or systems, such as for an individual business data processing system, a private network used with a plurality of client terminals, a remote or on-site data processing system, another form of client-server architecture, etc.

Modern computer networks incorporate layers of virtualization so that physically remote computers and computer components can be allocated to a particular task and then reallocated when the task is done. Users sometimes speak in terms of computing "clouds" because of the way groups of computers and computing components can form and split responsive to user demand, and because users often never see the computing hardware that ultimately provides the computing services. More recently, different types of computing clouds and cloud services have begun emerging.

For the purposes of this description, cloud services may be divided broadly into "low level" services and "high level" services. Low level cloud services (sometimes called "raw" or "commodity" services) typically provide little more than virtual versions of a newly purchased physical computer system: virtual disk storage space, virtual processing power, an operating system, and perhaps a database such as an RDBMS. In contrast, high or higher level cloud services typically focus on one or more well-defined end user applications, such as business oriented applications. Some high level cloud services provide an ability to customize and/or extend the functionality of one or more of the end user applications they provide; however, high level cloud services typically do not provide direct access to low level computing functions.

The ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system may include (but are not required to include, nor limited to only including): accounting, order processing, time and billing, inventory management, employee management/payroll, human resources management, and employee calendaring and collaboration, as well as reporting and analysis capabilities relating to these functions.

In a related development, substantial efforts have also been directed to integrated Customer Relationship Management (CRM) systems, with a view toward obtaining a better understanding of customers, enhancing service to existing customers, and acquiring new and profitable customers. By way of example, the capabilities or modules of a CRM system can include (but are not required to include, nor limited to only including): sales force automation (SFA), marketing automation, contact list, call center support, and web-based customer support, as well as reporting and analysis capabilities relating to these functions. With differing levels of overlap with ERP/CRM initiatives and with each other, efforts have also been directed toward development of increasingly integrated partner and vendor management systems, web store/eCommerce systems, product lifecycle management (PLM) systems, financial and revenue accounting systems, and supply chain management (SCM) systems.

FIG. 1 is a diagram illustrating elements or components of an example operating environment 100 in which an embodiment of the invention may be implemented. As shown, a variety of clients 102 incorporating and/or incorporated into a variety of computing devices may communicate with a distributed computing service/platform 108 through one or more networks 114. For example, a client may incorporate and/or be incorporated into a client application (e.g., software) implemented at least in part by one or more of the computing devices. Examples of suitable computing devices include personal computers, server computers 104, desktop computers 106, laptop computers 107, notebook computers, tablet computers or personal digital assistants (PDAs) 110, smart phones 112, cell phones, and consumer electronic devices incorporating one or more computing device components, such as one or more electronic processors, microprocessors, central processing units (CPU), or controllers. Examples of suitable networks 114 include networks utilizing wired and/or wireless communication technologies and networks operating in accordance with any suitable networking and/or communication protocol (e.g., the Internet).

The distributed computing service/platform (which may also be referred to as a multi-tenant business data processing platform) 108 may include multiple processing tiers, including a user interface tier 116, an application server tier 120, and a data storage tier 124. The user interface tier 116 may maintain multiple user interfaces 117, including graphical user interfaces and/or web-based interfaces. The user interfaces may include a default user interface for the service to provide access to applications and data for a user or "tenant" of the service (depicted as "Service UI" in the figure, which may also (or instead) represent a UI for use by the platform operator to configure or otherwise manage use of the platform), as well as one or more user interfaces that have been specialized/customized in accordance with user specific requirements (e.g., represented by "Tenant A UI", . . . , "Tenant Z UI" in the figure, and which may be accessed via one or more APIs). The default user interface may include components enabling a tenant or platform operator to administer the tenant's participation in the functions and capabilities provided by the service platform, such as accessing data, causing the execution of specific data processing operations, etc. Each processing tier shown in the figure may be implemented with a set of computers and/or computer components including computer servers and processors, and may perform various functions, methods, processes, or operations as determined by the execution of a software application or set of instructions. The data storage tier 124 may include one or more data stores, which may include a Service Data store 125 and one or more Tenant Data stores 126.

Each tenant data store 126 may contain tenant-specific data that is used as part of providing a range of tenant-specific business services or functions, including but not limited to ERP, CRM, eCommerce, Human Resources management, payroll, financials, accounting functions, etc. Data stores may be implemented with any suitable data storage technology, including structured query language (SQL) based relational database management systems (RDBMS).

In accordance with one embodiment of the invention, distributed computing service/platform 108 may be multi-tenant and service platform 108 may be operated by an entity (e.g., a platform operator) in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information. By way of another example, the functionality may include services, such as bill processing, that are suitable for asynchronous execution of logic on the multi-tenant and service platform 108.

The integrated business system shown in FIG. 1 may be hosted on a distributed computing system made up of at least one, but typically multiple, "servers." Rather than build and maintain such an integrated business system themselves, a business may utilize systems provided by a third party. Such a third party may implement an integrated business system/platform as described above in the context of a multi-tenant platform, wherein individual instantiations of a single comprehensive integrated business system are provided to a variety of tenants. One advantage to such multi-tenant platforms is the ability for each tenant to customize their instantiation of the integrated business system to that tenant's specific business needs or operational methods. Each tenant may be a business or entity that uses the multi-tenant platform to provide business data and functionality to multiple users. Some of those multiple users may have distinct roles or responsibilities within the business or entity.

Note that the architecture of FIG. 1 relates to aspects of an example multi-tenant architecture that supports processing for multiple tenants via internet access. Each tenant may use the multi-tenant architecture to support access to one or more applications, user interfaces, data stores and services in, for example, a Software-as-a-Service (SaaS) model. For example, a tenant's users (employees and/or customers) may access the data and applications resident on the platform remotely using a suitable client device and communications network.

The integrated multi-tenant system shown in FIG. 1 may consist of multiple applications and data stores, and may be hosted on a distributed computing system made up of at least one, but likely multiple, "servers." A server is a physical computer dedicated to run one or more software services intended to serve the needs of the users of other computers that are in data communication with the server, for instance via a public network such as the Internet or a private "intranet" network. The server, and the services it provides, may be referred to as the "host" and the remote computers, and the software applications running on the remote computers, being served may be referred to as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

In general, an embodiment of the invention may be used in conjunction with (or implemented as) a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

Note that each user interface (such as elements 117 of FIG. 1) may include one or more interface elements. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

The application layer (such as element 120 of FIG. 1, or applications installed on server elements 122) may include one or more application modules, each having one or more sub-modules. Each application module or sub-module may correspond to a particular function, method, process, or operation that is implemented by the module or sub-module (e.g., a function or process related to providing ERP, CRM, eCommerce, financial accounting, revenue recognition, or other functionality to a user/tenant of the platform). Such function, method, process, or operation may also include those used to implement one or more aspects of the inventive system and methods, such as for providing equitable job processing for multiple tenants in a multi-tenant computing environment.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 122 of FIG. 1) may include each application module. Alternatively, different application servers may include different sets of application modules. Such sets may be disjoint or overlapping.

A data storage layer (such as element 124 of FIG. 1, or elements of datastores 125 or 126) may include one or more data objects, each having one or more data object components, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Figure 2:
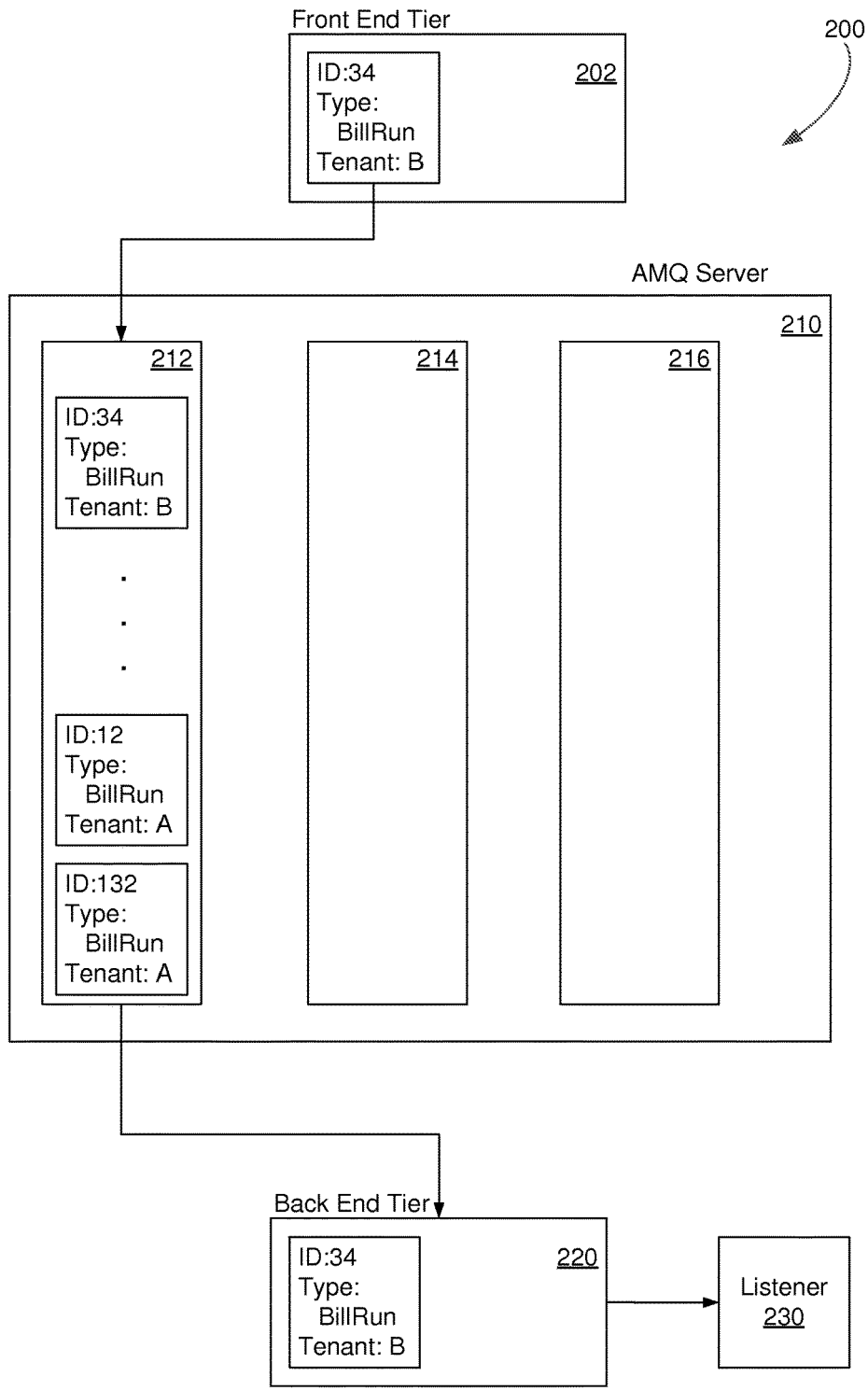
FIG. 2 is a functional block diagram illustrating a conventional architecture for processing asynchronous messages in a multi-tenant computing platform.

FIG. 2 is a diagram illustrating an example of a conventional architecture 200 for handling asynchronous messages for a shared bill run service in a multi-tenant system, where the messages pertain to different tenants. In this example, a front end tier (FET) device 202, e.g. an edgeserver, receives a BillRun type message ID:34 for Tenant B. The FET sends message ID:34 to an asynchronous message queue (AMQ) server 210, which places the message ID:34 in a BillRun queue 212 in the order that the message is received by the AMQ 210. This results in message ID:34 being placed in the queue behind messages ID:12 and ID:132 for Tenant A. A back end tier (BET) device 220, e.g. a message consumer or server for processing messages, that supports the Bill Run service dequeues messages from the Bill Run queue 212 in order, e.g. first in first out (FIFO), and processes the Bill Run messages, which, in this example, are provided to Listener device 230.

For a variety of reasons, e.g. an end of billing cycle rush, Tenant A may experience a large number of messages that arrive within a given time interval that crowd out the message for Tenant B. In the scenario of FIG. 2, the multiple messages for Tenant A that are in order ahead of the message for Tenant B in the BullRun queue results in delayed Bill Run processing for Tenant B because all of the messages ahead of message ID:34 for Tenant B in the BillRun queue are processed before message ID:34 is processed. This may result in unacceptable performance for Tenant B due to the demand for resources from the messages for Tenant A. While the example discussed relates to a BillRun Queue, many other types of queues in a multi-tenant environment, e.g. Async Export, may be supported by other queues provided in AMQ 210, such as 214 and 216.

Figure 3:
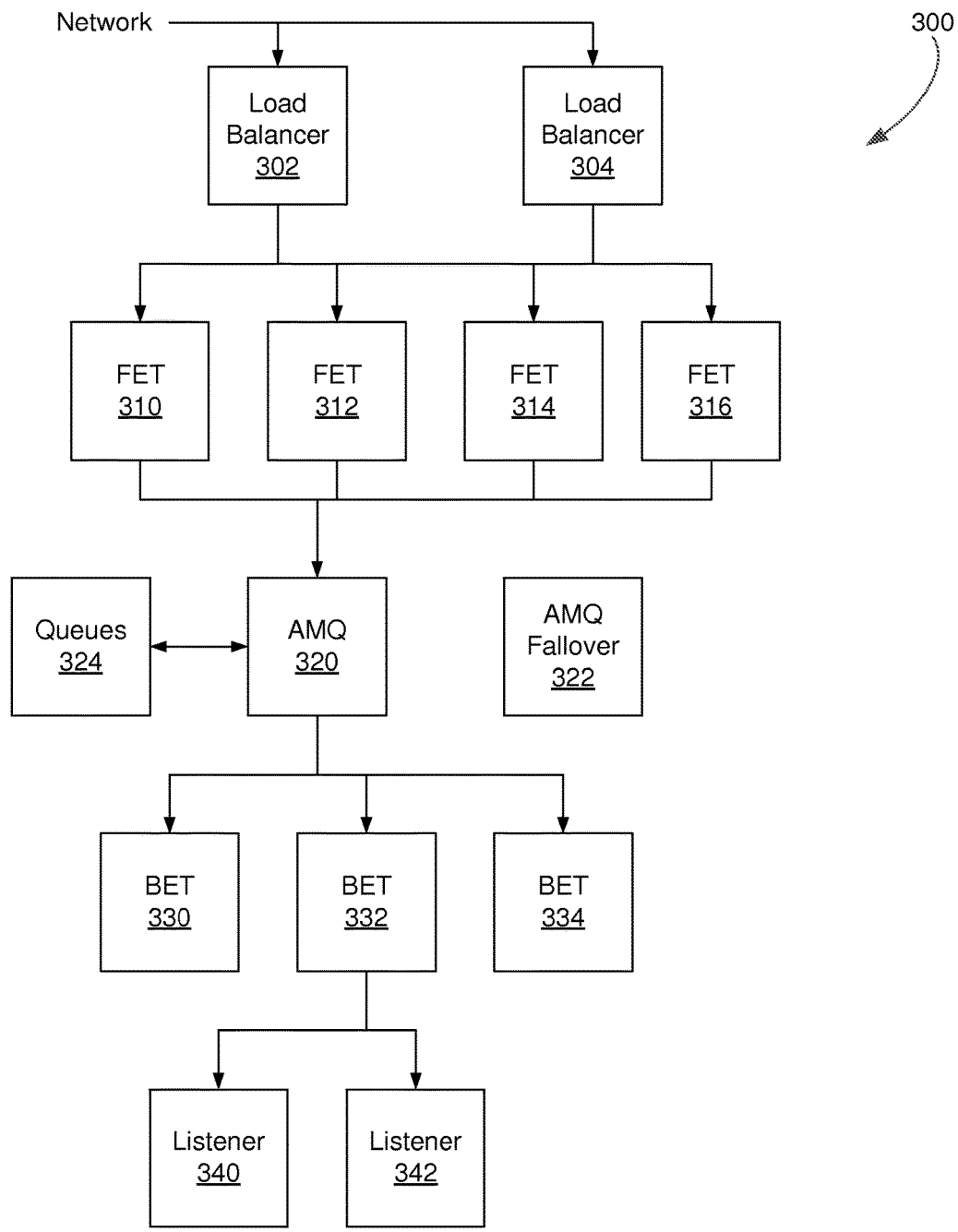
FIG. 3 is a diagram illustrating an example of an architecture for equitably processing messages for multiple tenants in a multi-tenant service provider platform, and that includes elements of an embodiment of the invention.

FIG. 3 is a schematic diagram illustrating an example of an architecture 300 suitable for implementation of equitable job processing. In the example shown, a pair of highly available load balancer devices 302 and 304 receive request traffic from a network and balance the received traffic across a set of front end tier (FET) devices 310, 312, 314 and 316, e.g. edgeservers. Based on the request type, the FET devices 310, 312, 314 and 316 forward messages to an asynchronous message queue (AMQ) broker device 320, which maintains message processing queues 324 for a set of back end tier (BET) devices 330, 332 and 334. AMQ Fallover device 322 is a backup for AMQ device 320. In this example, BET device 332 retrieves messages from one of queues 324 on the AMQ broker device 320 in order to perform the functionality associated with the queue and provides the results to Listeners 340 and 342. As noted above with respect to FIG. 2, messages pertaining to several different tenants may arrive and be enqueued at the same time. BET devices may be utilized to process one type of messages from a single queue or multiple message types from multiple queues and multiple BET devices may be configured to process messages of the same type from a single queue.

Figure 4:
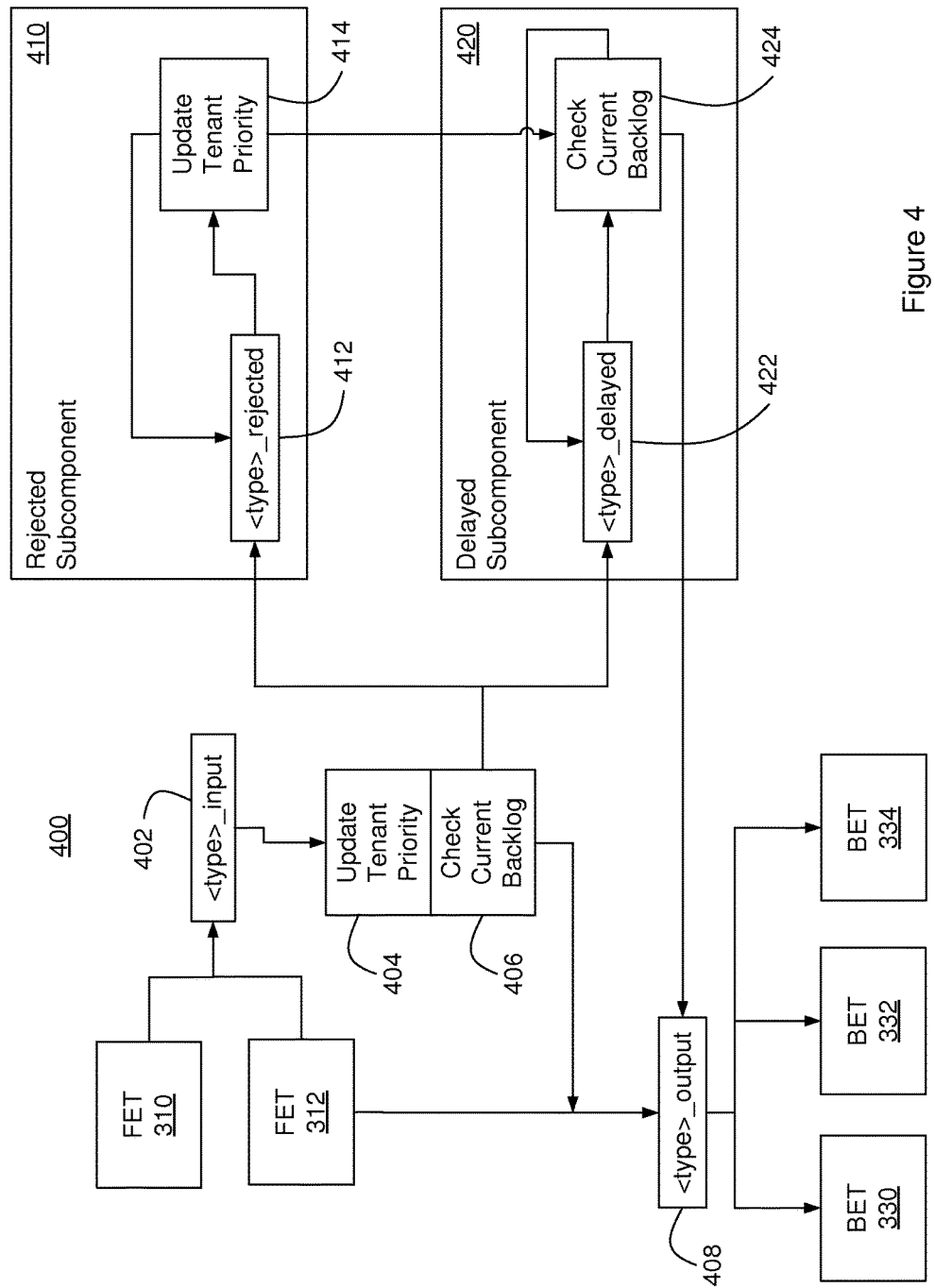
FIG. 4 is a logical diagram illustrating elements of an example of an equitable job processing process to determine the processing of messages for multiple tenants in a multi-tenant service provider platform.

FIG. 4 is a simplified logic diagram illustrating one example of a process 400 for performing equitable job processing in an AMQ broker device in a multi-tenant platform. Input messages received from the FETs 310 and 312 are placed in input queue 402 and initially processed by Tenant Priority Update Subcomponent 404, which updates a tenant priority for the tenant identified in the message. For example, a tenant's priority may be initially determined by a service level for the tenant, e.g. higher priority for a higher level of service for the tenant, made incrementally lower for each message received for that tenant. Check Current Backlog Subcomponent 406 checks the current backlog of message processing in the multi-tenant platform to determine a priority threshold, e.g. based on the number of pending messages of the given message type. If the tenant's priority is above the priority threshold, then the message is enqueued in output queue 408 for the type of message for processing by the BETs 330, 332 and 334, in this example.

If the tenant priority is below the threshold determined based on the current backlog for the message type, then the message is placed in either rejected queue 412 or delayed queue 422. In this example, the message is placed in rejected queue 412 if the priority is a predetermined rejection amount lower than the current priority threshold, e.g. the tenant has experienced a very high number of messages within a short time period, such that additional messages from the tenant are rejected. The message is placed in delayed queue 422 if the tenant priority is lower than the current priority threshold, but not lower than the current priority threshold by the rejection threshold, such that processing of the message is delayed, but not rejected.

A Delayed Subcomponent 420 processes messages in the delayed queue 422 by checking the current backlog 424 to again determine the corresponding threshold, which may change as messages clear output queue 408. If the priority of the tenant for a message is greater than the current threshold, then the message is transferred to the output processing queue 408. If the tenant priority remains lower than the current threshold, then the message is returned to the delayed queue 422.

In this example, Rejected Subcomponent 410 processes messages in the rejected queue 412 by updating the tenant priority 414 based on the amount of traffic observed for the tenant. If the tenant's priority is unchanged, then the message is returned to the rejected queue. If the tenant's priority has increased, then the message may be transferred to the Delayed Subcomponent 420 for further processing as described above. Note that, in some examples, if the current load on the multi-tenant platform is sufficiently low, then equitable processing may not be performed, e.g. is disabled, and messages are sent to the output processing queue 408 as they are received from the FETs 310, 312.

Figure 5A:
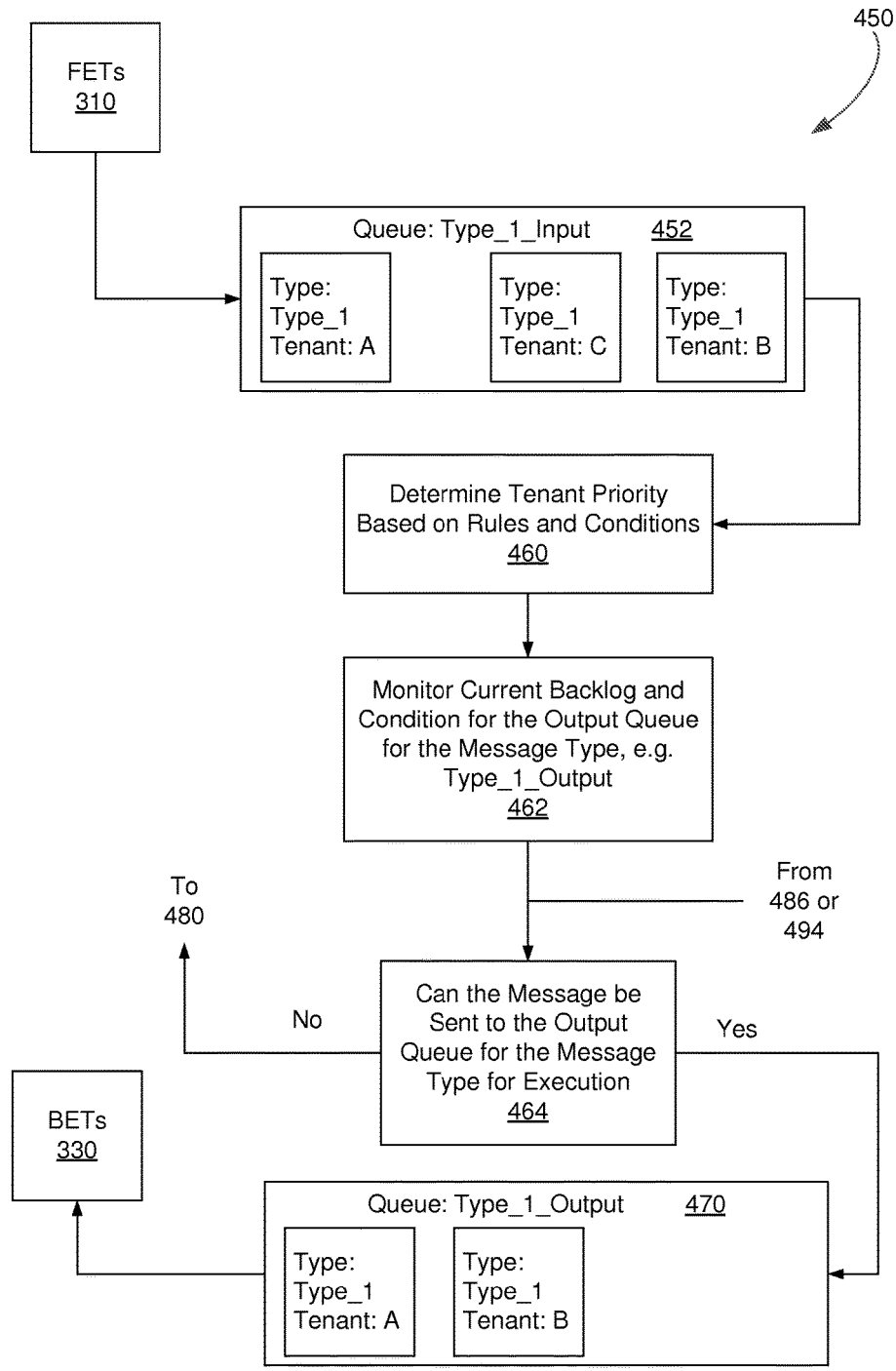
FIG. 5A is a control flow diagram illustrating elements of one example of an equitable job processing process for processing of messages for multiple tenants in a multi-tenant service provider platform.
Figure 5B:
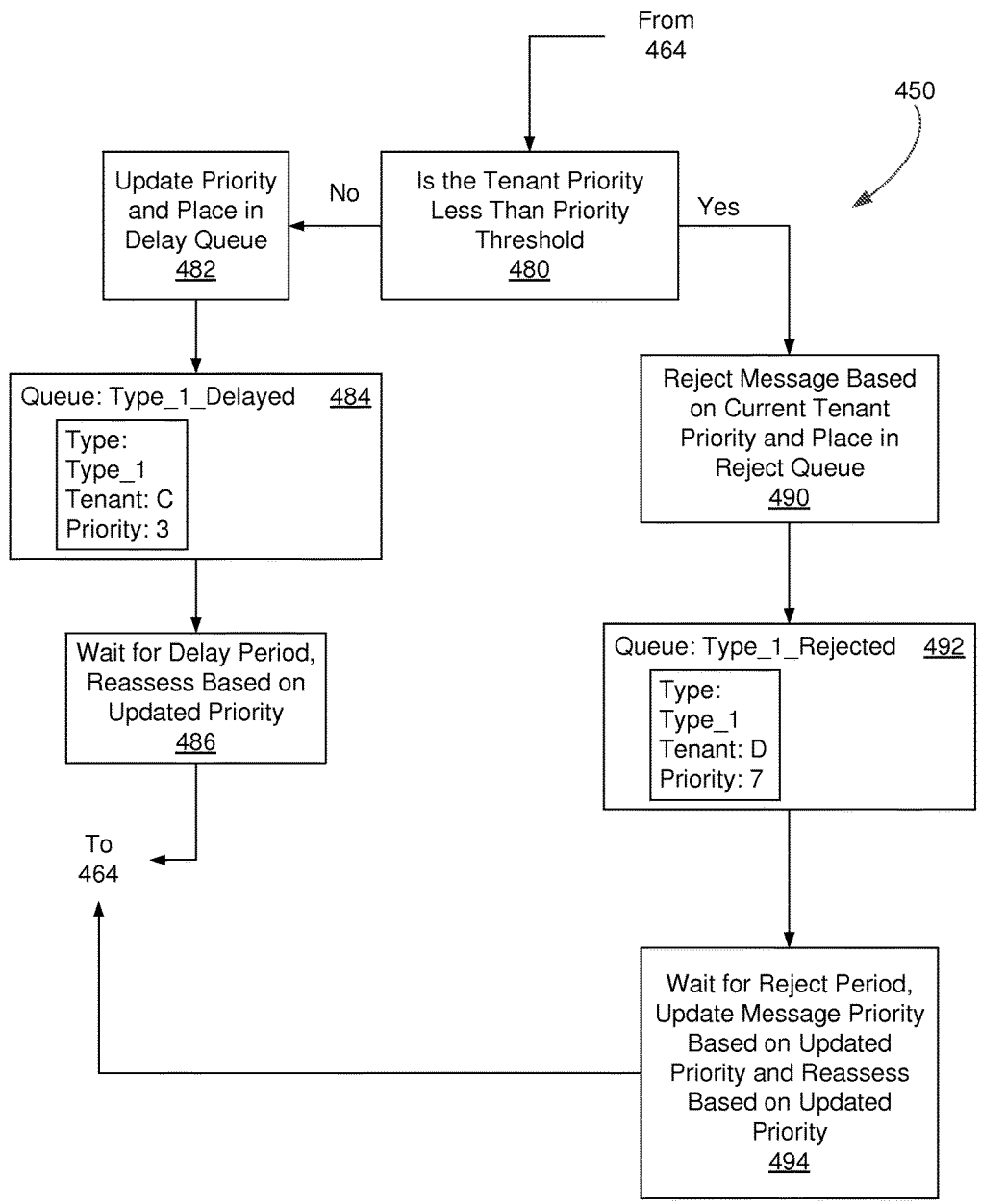
FIG. 5B is a control flow diagram illustrating additional elements of one example of an equitable job processing process for processing of messages for multiple tenants in a multi-tenant service provider platform.

FIGS. 5A and 5B are control flow diagrams illustrating an example of equitable job processing scenario involving tenant priority. In this example, Type_1 type messages from the FETs 310, such as a Type_1 message type for Tenant A, are received in the AMQ broker device and placed in the Type_1_Input queue 452, which is the input queue to the equitable job processing process in this example. Messages in the Type_1_Input queue 452 are processed, in this example, in the order that the messages are received.

A first processing component 460 determines the tenant priority based on a set of one or more rules and conditions. In one example, the rules are: the priority of a tenant is between 0 and 9; the tenant priority is updated for each incoming message; and each incoming message decreases the priority of the corresponding tenant. Examples of other rules may include: a particular tenant's priority cannot be lower than a predetermined priority level (e.g. the customer is guaranteed at least a minimum priority level); a particular tenant's priority cannot be higher than a predetermined priority (e.g. the customer is provided with a lower level of service); a particular tenant's priority could be immutable (e.g. the customer has a guaranteed priority level); or tenant priority is determined by factors outside the equitable job processing function (e.g. duration of the execution of messages, or total backlog, or business relevance of the tenant). In another example, tenant priority is determined solely based on the number of messages of that type currently executed, in a binary fashion (i.e. if there are more than four messages being executed for that tenant and type, then the tenant priority is 0, else the tenant priority is 9). This approach would allow the multi-tenant system to veto the execution of messages beyond a given level for a tenant.

After the tenant priority is updated, in this example, a second processing subcomponent 462 monitors the current backlog and conditions for the equitable job processing output queue Type_1_Output 470. At subcomponent 462, the process 450 checks the current status of the output queue 470 and possibly other conditions to determine, for example, a tenant priority threshold and a message priority threshold. In one example, the Type_1_Output queue 470 status is determined based on a ratio between a selected parameter (e.g. for each message type) and the number of messages currently enqueued. The resulting message priority calculation is a percentage of a maximum allowed backlog by message type. In other embodiments, the Type_1_Output queue 470 status may also be determined in other ways or by combining multiple ways. For example, the message priority or tenant priority threshold may be determined based on the resources available, e.g. the number of active BETs 330, and not on the message backlog. In another example, the queue status may be a binary threshold variable, e.g. if there more than twelve messages of this type being executed, then do not accept this type of message for anybody, e.g. place in reject queue.

Message queue subcomponent 464 determines if the tenant priority and/or other conditions indicate that the message may be processed immediately, then the message is placed in the Type_1_Output queue 470 for processing by the BETs 330.

If, however, the message or tenant priority is below current status levels, such as those discussed above, then the message is delayed or rejected at 464 and control branches to Priority Check subcomponent 480. For example, if the tenant priority is high enough to process the message, but the message priority is below a given threshold, e.g. no more messages of a particular type may be placed in the output queue 470, then the message is merely delayed due to the current backlog and/or conditions rather than the tenant priority and the message is placed in a Type_1_Delayed queue 484. At 486, messages in the delayed queue 484 will be periodically reevaluated when the backlog is reduced to determine if it may be placed in the Type_1_Output queue 470 by branching to 464. In one example, even if a tenant becomes low priority, and therefore its new incoming messages are rejected, the messages for that tenant on the delayed queue 484 are not rejected because the priority of the message is not updated.

If the tenant priority is less than a given priority threshold at 480, then, at 490, message processing is rejected because the tenant's current priority is too low to process its messages and the message is placed in Type_1_Rejected queue 492. At 494, messages in the Type_1_Rejected queue 492 are reevaluated, for example, when a tenant's priority level is updated, wherein the message priority is updated based on the tenant's priority and the process branches to 464 where the message is reevaluated for placement in the Type_1_Output queue 470.

The priority of a tenant may be updated for a variety of reasons. In one example, if the priority of a tenant was increased at 460 when processing messages on the Type_1_Input queue 452, then the priority of all other messages for that tenant on the Type_1_Rejected queue 492 are also updated and the messages processed accordingly. The rationale, for this example, is that if an incoming message is accepted for execution, then the tenant is no longer causing issues and the Type_1_Output queue 470 is no longer experiencing a backlog. The priority of a tenant may also be increased by a given delta after each interval of time of a selected or predetermined duration if it has not been decreased in a previous time interval.

Figure 6:
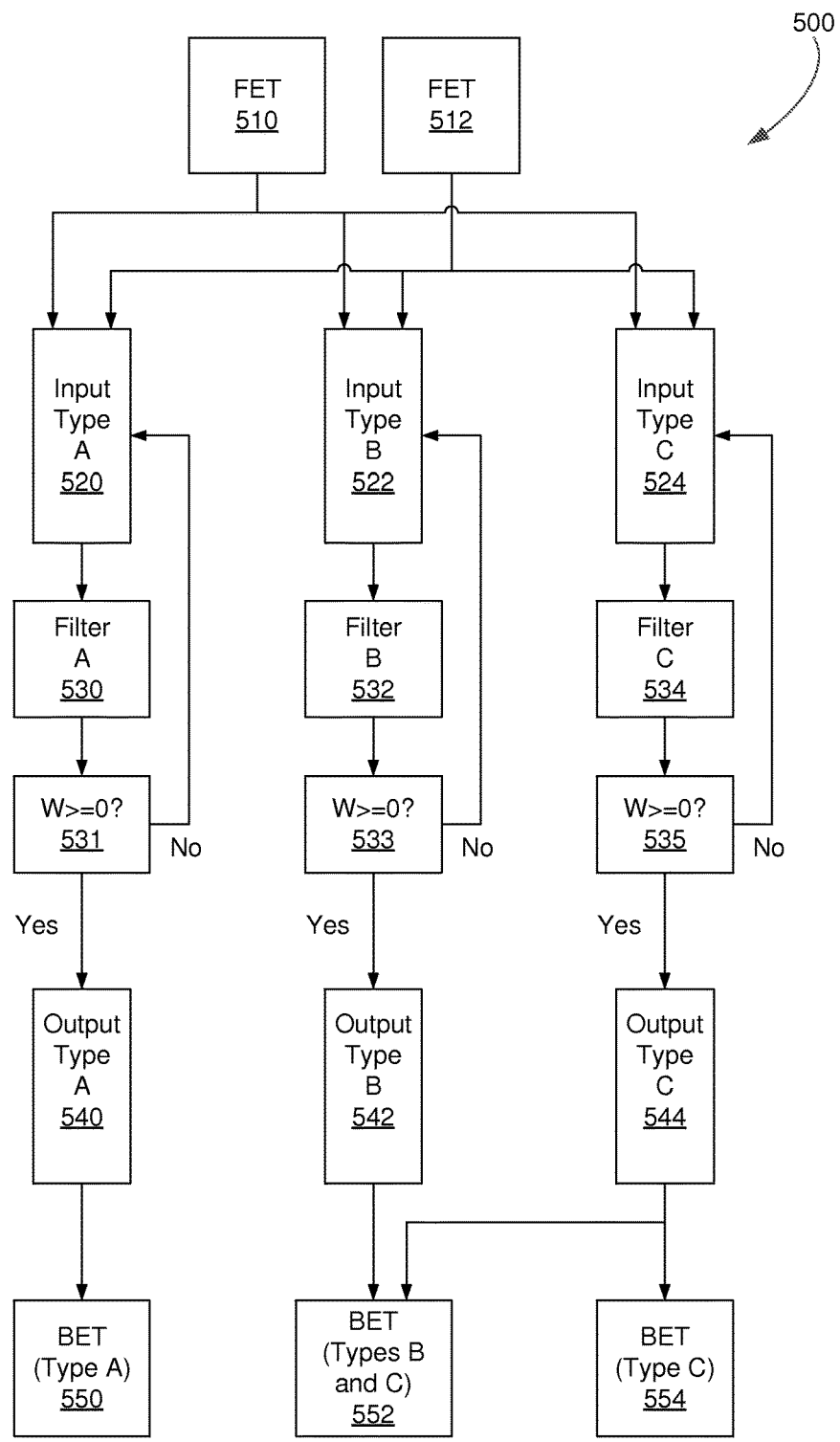
FIG. 6 is a logical diagram illustrating an architecture of an example of an equitable job processing process for processing of messages for multiple tenants in a multi-tenant service provider platform.

FIG. 6 is a schematic diagram illustrating another example of an architecture 500 for equitably processing messages in accordance with certain aspects of the present invention. In this example, incoming messages from FET 510 and 512 are placed on an input queue corresponding to the message type, e.g. Input queue for Type A 520, Input queue for Type B 522 and Input queue for Type C 524.

Filters 530, 532 and 534 evaluate the messages in their corresponding input queue. The Filter modules determine a priority weight W for each message based, in this example, on the tenant and type for the message. These Filter modules, in some examples, may have the same functionality or, in other examples, the filter functions for different types of messages may be different from one another. In some applications, the filtering function may need to be sufficiently fast to accommodate streaming data.

At decision modules 531, 533 and 535, an evaluation is made whether a priority of the tenant indicates that the message may be moved to the corresponding output queue, e.g. output queues 540, 542 and 544, for processing by BETs 550, 552 and 554. Note that BETs may be configured to process messages of one or more certain types. In the example shown, BET 550 only processes Type A messages from Output queue 540, BET 552 process Type B and C messages from Output queues 542 and 544, respectively, while BET 554 processes only Type C messages from Output queue 544. In some examples, the rate of processing of a specific BET or multiple BETs may be considered in setting priorities and thresholds.

If the tenant priority W is greater than or equal to 0, in this example, the message is moved to the output queue. If W is less than 0, then the message is returned to the input queue. In an alternative example, delayed or rejected message may be placed in other buffering queues, e.g. the delay queue 422 and rejected queue 412 of FIG. 4.

Figure 7:
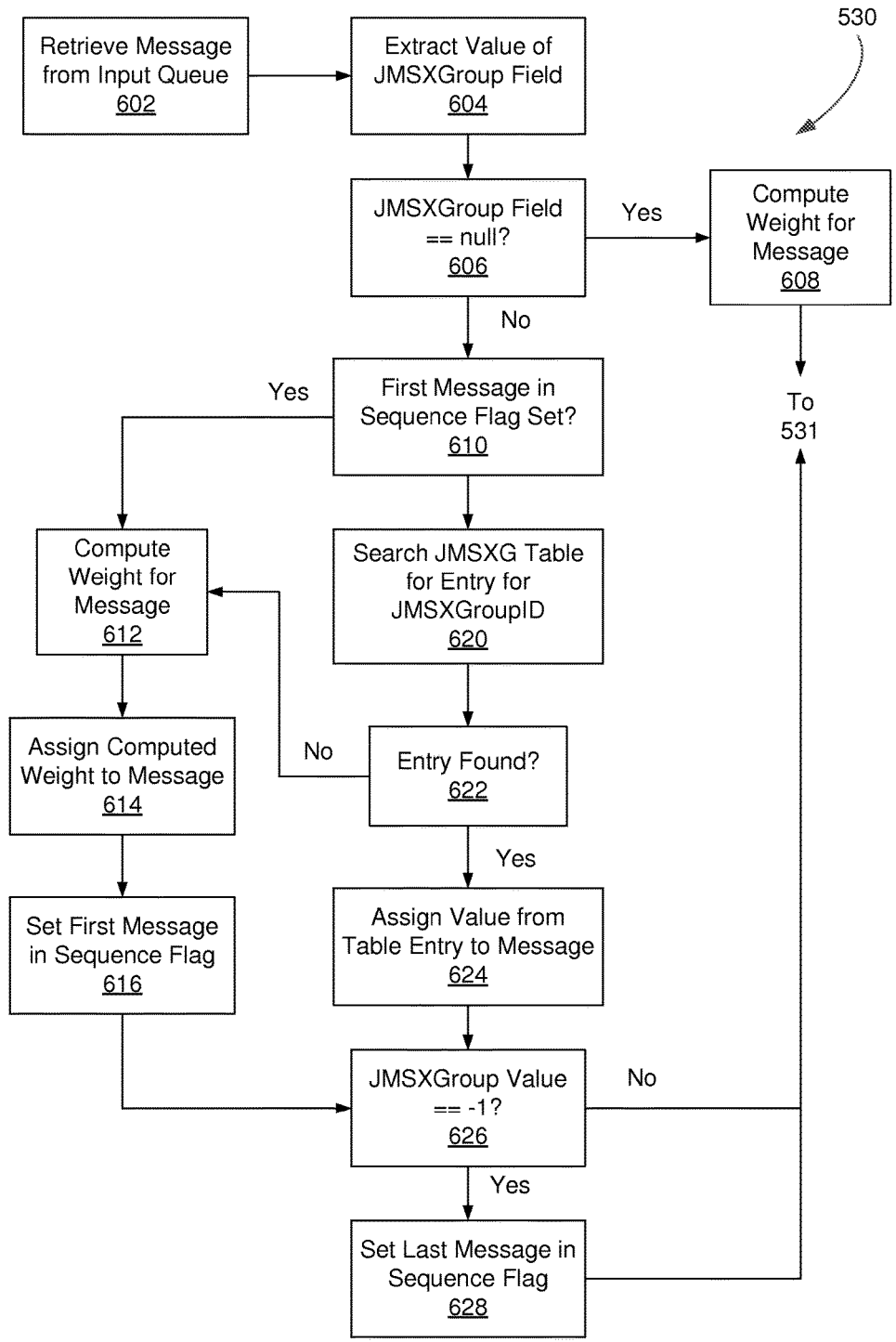
FIG. 7 is a control flow diagram illustrating one example of logic for a filter element in FIG. 6.

FIG. 7 is a control flow diagram illustrating one example of the Filter function 530 shown in FIG. 6 that relates to Java Message Service processing, which may involve handling of group IDs, e.g. JMSGroupIDs, to be executed as a group. While this example is discussed in the context of Filter A 530, it may also apply to Filter B 532 and Filter C 534. At 602, a message is retrieved from an input queue and, at 604, a value of its JMSXGroup field is extracted. At 606, if the JMSXGroup field is null, control branches to step 608 to compute a priority weight for the message based, for example, on the tenant, and then to function 531 for assignment of the message to a queue based on the priority level of the message.

If the JMSXGroup field is not null, control branches to step 610. If the message has its First Message in Sequence Flag set, control branches to 612 for computation of the priority weight, step 614 to assign the computed priority weight to the message, step 616 to set the First Message in Sequence Flag, and control continues to 626 for further consideration.

If the First Message in Sequence Flag is not set at 610, control branches to 620 to search a JMSXG Table for an entry corresponding to the JMSXGroupID. If an entry is not found, control branches at 622 to 612 for computation of the priority weight for the message. If an entry is found at 622, control branches to 624 to assign a priority weight value from the table entry to the message.

At step 626, the JMSXGroup value from the table entry is checked to see if it is set to −1. If not, then control branches to step 531 for consideration of the priority level for assigning the message to a queue. If it is, then, at 628, a Last Message in Sequence Flag is set and control branches to function 531 of FIG. 6.

Figure 8:
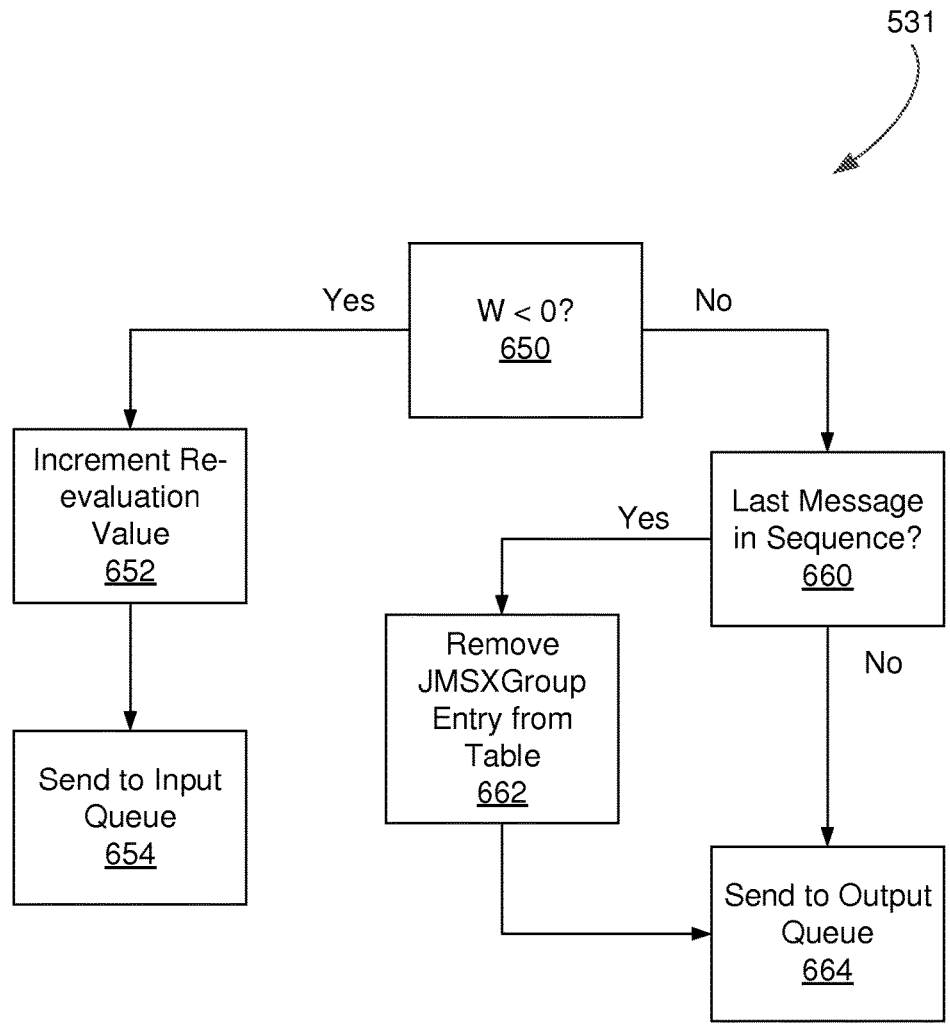
FIG. 8 is a control flow diagram illustrating one example of logic for an output selection element in FIG. 6.

FIG. 8 is a control flow diagram illustrating one example of the function 531. At 650, if the priority weight W is less than 0, then, at 652, a Re-evaluation Value for the message is incremented, which raises the priority of the message for subsequent consideration, and, at 654, the message is returned to the input queue.

If the priority weight W is not less than 0, then the Last Message in Sequence Flag is checked for the message. If the flag is set, control branches to 662 to remove the JMSX-Group Table entry for the JMSXGroupID and the message is placed in the output queue at 664. If the flag is not set, then control branches directly from 660 to 664 for assignment of the message to the output queue.

Figure 9:
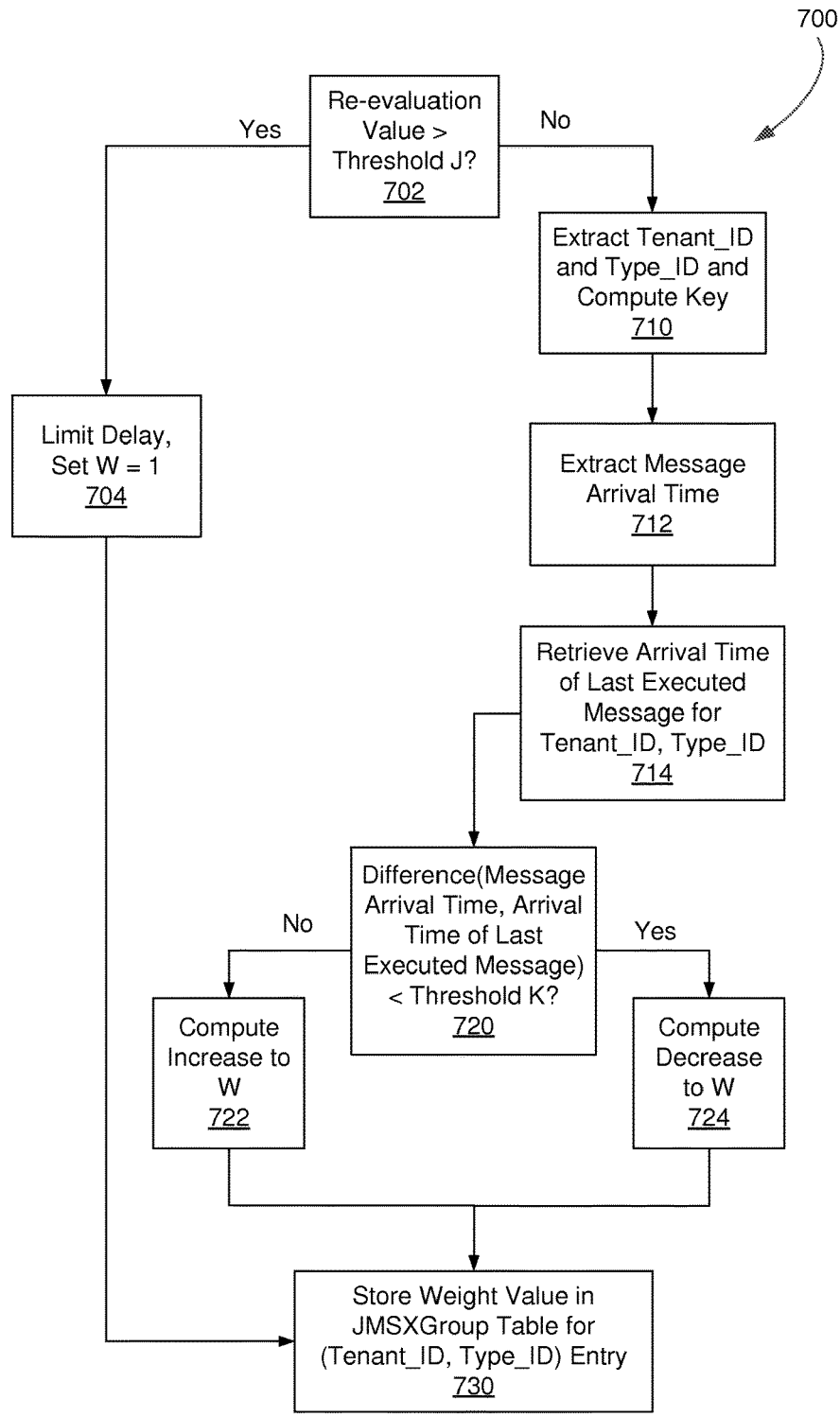
FIG. 9 is a control flow diagram illustrating one example of logic for message weighting element in FIG. 7.

FIG. 9 is a control flow diagram illustrating one example of logic for computing priority weight W for a message that may be suitable for application in the logic of FIGS. 6-8. At 702, the Re-evaluation value for the message is checked against a maximum delay threshold J that represents a maximum number of re-evaluations selected for the system in order to ensure that a message is not deferred indefinitely. If the Re-evaluation value exceeds J, then control flows to 704 to limit delay by setting the priority weight W to 1, which is greater than 0 forcing the message to be moved to the output queue for processing. In some examples, because this approach may disrupt the ordering of messages, certain tenants, JMSXGroupIDs or Type_IDs may have W set to >0 to force the messages to be sent to the output queue. However, as the weight is set to W>0 for an increasing number of messages, this approach tends to devolve back to the conventional solution.

If the Re-evaluation value does not exceed J, then control flows to 710 to extract the Tenant_ID and Type_ID from the message a compute a key based on these values. At 712, the message arrival time is extracted from the message under consideration. At 714, the arrival time of the most recently executed message for the Tenant_ID and Type_ID is retrieved. At 720, the difference between the message arrival time and the arrival time of the most recently executed message is compared to a threshold K, which is selected to set a minimum interval between message for the same Tenant_ID and Type_ID for adjusting the weight W for the Tenant_ID and Type_ID. If the difference is less than threshold K, then control branches to 724 to compute a decrease in W, e.g. reduce the priority weight for the Tenant_ID and Type_ID.

If the difference is not less than threshold K, then control branches to 722 to compute an increase in W, e.g. increase the priority weight for the Tenant_ID and Type_ID. At 730, the new value for W is stored in the JMSXGroup Table entry for the Tenant_ID and Type_ID. In this way, the priority weight is increased when the interval between the current message and the last message executed for the Tenant_ID and Type_ID becomes too large and is decreased when the interval is below the selected threshold interval K.

In general, in order to achieve a round robin effect, weights are generally computed so that messages for types and tenants that may bias the equitability of the approach are assigned W<0, e.g. verbose tenant processes or low priority processes are given lower values of W. Additional factors that may be considered for computation of weights may include: the number of messages in the interval and not just the frequency; different functions may be applied for different tenants (e.g. to obtain different priority weights for tenants under the same circumstances); guaranteed delivery for some tenants and types (e.g. W>0 always for a tenant with high service requirements); and variable interval rates (e.g. reject messaged based on K variable on the type of messages).

Note that the example computing environments depicted in the figures are not intended to be limiting examples. Alternatively, or in addition, computing environments in which an embodiment of the invention may be implemented include any suitable system that permits users to provide data to, and access, process, and utilize data stored in a data storage element (e.g., a database) that can be accessed remotely over a network. Although further examples below may reference the example computing environment depicted in the figures, it will be apparent to one of skill in the art that the examples may be adapted for alternate computing devices, systems, apparatuses, processes, and environments.

Figure 10:
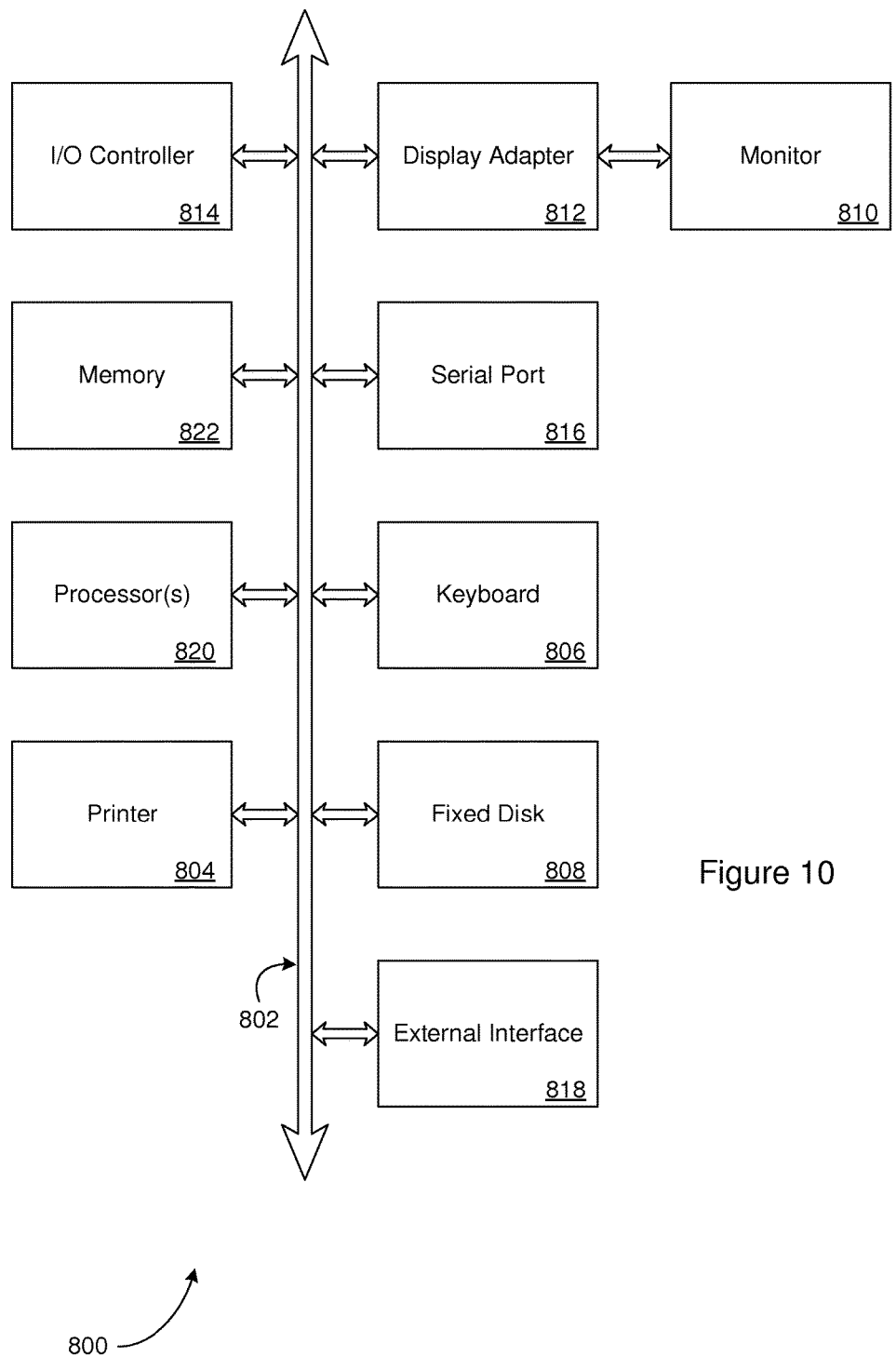
FIG. 10 is a diagram illustrating elements or components that may be present in a computer device or system configured to implement a method, process, function, or operation in accordance with an embodiment of the invention.

In accordance with one embodiment of the invention, the system, apparatus, methods, processes, functions, and/or operations for enabling efficient configuration and presentation of a user interface to a user based on the user's previous behavior may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 10 is a diagram illustrating elements or components that may be present in a computer device or system 800 configured to implement a method, process, function, or operation in accordance with an embodiment of the invention. The subsystems shown in FIG. 10 are interconnected via a system bus 802. Additional subsystems include a printer 804, a keyboard 806, a fixed disk 808, and a monitor 810, which is coupled to a display adapter 812. Peripherals and input/output (I/O) devices, which couple to an I/O controller 814, can be connected to the computer system by any number of means known in the art, such as a serial port 816. For example, the serial port 816 or an external interface 818 can be utilized to connect the computer device 800 to further devices and/or systems not shown in FIG. 10 including a wide area network such as the Internet, a mouse input device, and/or a scanner. The interconnection via the system bus 802 allows one or more processors 820 to communicate with each subsystem and to control the execution of instructions that may be stored in a system memory 822 and/or the fixed disk 808, as well as the exchange of information between subsystems. The system memory 822 and/or the fixed disk 808 may embody a tangible computer-readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, Javascript, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM where the code is persistently stored sufficient for a processing device to access and execute the code at least once. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted. Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A job processing system for processing asynchronous messages for multiple tenants in a multi-tenant platform, the system comprising:

at least one hardware processor;

memory storing computer instructions, the computer instructions when executed by the at least one hardware processor configured to cause the at least one hardware processor to:

receive by an input buffer a plurality of asynchronous messages from at least one front end tier device, the plurality of asynchronous messages being associated with one or more of multiple tenants in a multi-tenant platform, each asynchronous message of the plurality of asynchronous messages having a message type of multiple message types and being associated with a particular one of the one or more of the multiple tenants;

determine an execution demand of the plurality of asynchronous messages of each message type for each of the one or more of the multiple tenants;

determine a priority weight for each asynchronous message of the plurality of asynchronous messages received based on a service level associated with a tenant associated with the asynchronous message and based on the execution demand of the plurality of asynchronous messages for the tenant of the message type associated with the asynchronous message;

generate a decision whether to allow or to delay each asynchronous message of the plurality of asynchronous messages based on the priority weight determined for the asynchronous message;

if the decision indicates to delay a particular asynchronous message of the plurality of asynchronous messages, deliver the particular asynchronous message to a delay buffer;

if the decision indicates to allow the particular asynchronous message of the plurality of asynchronous messages, deliver the particular asynchronous message to an output buffer for the particular asynchronous message to wait its turn to be processed by the at least one hardware processor; and adjust the priority weight of each asynchronous message in the delay buffer based on delay information.

2. The job processing system of claim 1, wherein the computer instructions are further configured to cause the at least one hardware processor to check a current backlog status, determine a priority threshold based on the current backlog status, and move the particular asynchronous message from the delay buffer to the output buffer if the priority weight of the particular asynchronous message is not less than the priority threshold.

3. The job processing system of claim 2, wherein the computer instructions are further configured to cause the at least one hardware processor to:

move the particular asynchronous message to a rejected buffer if the priority weight of the particular asynchronous message is less than the priority threshold by a rejection threshold value;

check an amount of message traffic for the tenant and message type of the particular asynchronous message;

update the priority weight of the particular asynchronous message if the amount of message traffic has changed; and move the particular asynchronous message from the rejected buffer to the delay buffer if the updated priority weight has increased for the particular asynchronous message.

4. The job processing system of claim 1, wherein the computer instructions are further configured to cause the at least one hardware processor to:

increment a re-evaluation value for the particular asynchronous message when the particular asynchronous message is delayed; and set the priority weight to a value that is equal to or greater than a priority threshold if the re-evaluation value exceeds a maximum delay threshold.

5. The job processing system of claim 1, wherein the input buffer, the delay buffer and the output buffer are parts of the memory.

6. The job processing system of claim 1, wherein the execution demand is calculated as a count of the plurality of asynchronous messages of a particular message type for a particular one of the one or more of the multiple tenants.

7. The job processing system of claim 1, wherein the execution demand is calculated as an execution time.

8. The job processing system of claim 1, wherein the execution demand is calculated as a frequency.

9. The job processing system of claim 1, wherein the execution demand is calculated as an interval rate.

10. The job processing system of claim 1, wherein the computer instructions configured to cause the at least one hardware processor to determine the priority weight for each asynchronous message of the plurality of asynchronous messages received based on the service level associated with the tenant associated with the asynchronous message and based on the execution demand of the plurality of asynchronous messages for the tenant of the message type associated with the asynchronous message include computer instructions configured to cause the at least one hardware processor to determine the priority weight for each asynchronous message of the plurality of asynchronous messages received by reducing the service level based on the execution demand of the plurality of asynchronous messages for the tenant of the message type associated with the asynchronous message.

11. The job processing system of claim 1, wherein the computer instructions configured to cause the at least one hardware processor to determine the priority weight for each asynchronous message of the plurality of asynchronous messages received based on the service level associated with the tenant associated with the asynchronous message and based on the execution demand of the plurality of asynchronous messages for the tenant of the message type associated with the asynchronous message include computer instructions configured to cause the at least one hardware processor to determine the priority weight for each asynchronous message of the plurality of asynchronous messages received by reducing the service level, but no less than a low-end boundary, based on the execution demand of the plurality of asynchronous messages for the tenant of the message type associated with the asynchronous message.

12. The job processing system of claim 1, wherein the asynchronous messages of a particular message type of at least one particular tenant of the multiple tenants retain a static priority value.

13. The job processing system of claim 1, wherein the computer instructions configured to cause the at least one hardware processor to determine the priority weight for each asynchronous message of the plurality of asynchronous messages received include computer instructions configured to cause the at least one hardware processor to determine the priority weight for each asynchronous message of the plurality of asynchronous messages of a first type for a first particular tenant according to a first rule, and to determine the priority weight for each asynchronous message of the plurality of asynchronous messages of the first type for a second particular tenant according to a second rule.

14. A method of job processing asynchronous messages for multiple tenants in a multi-tenant platform, the method comprising the steps of:
    receiving by an input buffer a plurality of asynchronous messages from at least one front end tier device, the plurality of asynchronous messages being associated with one or more of multiple tenants in a multi-tenant platform, each asynchronous message of the plurality of asynchronous messages having a message type of multiple message types and being associated with a particular one of the one or more of the multiple tenants;
    determining an execution demand of the plurality of asynchronous messages of each message type for each of the one or more of the multiple tenants;
    determining a priority weight for each asynchronous message of the plurality of asynchronous messages received based on a service level associated with a tenant associated with the asynchronous message and based on the execution demand of the plurality of asynchronous messages for the tenant of the message type associated with the asynchronous message;
    generating a decision whether to allow or to delay each asynchronous message of the plurality of asynchronous messages based on the priority weight determined for the asynchronous message;
    if the decision indicates to delay a particular asynchronous message of the plurality of asynchronous messages, delivering the particular asynchronous message to a delay buffer;
    if the decision indicates to allow the particular asynchronous message of the plurality of asynchronous messages, delivering the particular asynchronous message to an output buffer for the particular asynchronous message to wait its turn to be processed; and
    adjusting the priority weight of each asynchronous message in the delay buffer based on delay information.

15. The method of claim 14, further comprising the steps of checking a current backlog status, determining a priority threshold based on the current backlog status, and moving the particular asynchronous message from the delay buffer to the output buffer if the priority weight of the particular asynchronous message is not less than the priority threshold.

16. The method of claim 15, further comprising the steps of:
    moving the particular asynchronous message to a rejected buffer if the priority weight of the particular asynchronous message is less than the priority threshold by a rejection threshold value;
    checking an amount of message traffic for the tenant and message type of the particular asynchronous message;
    updating the priority weight of the particular asynchronous message if the amount of message traffic has changed; and
    moving the particular asynchronous message from the rejected buffer to the delay buffer if the updated priority weight has increased for the particular asynchronous message.

17. The method of claim 14, wherein:
    the step of delaying the particular asynchronous message further includes incrementing a re-evaluation value for the particular asynchronous message when the particular asynchronous message is delayed; and
    the step of determining the priority weight for each asynchronous message further includes setting the priority weight to a value that is equal to or greater than a priority threshold if the re-evaluation value exceeds a maximum delay threshold.

18. A non-transitory computer readable medium storing computer code having instructions stored therein that configure a processing device to operate to perform job processing of asynchronous messages as follows:
    receive by an input buffer a plurality of asynchronous messages from at least one front end tier device, the plurality of asynchronous messages being associated with one or more of multiple tenants in a multi-tenant platform, each asynchronous message of the plurality of asynchronous messages having a message type of multiple message types and being associated with a particular one of the one or more of the multiple tenants;
    determine an execution demand of the plurality of asynchronous messages of each message type for each of the one or more of the multiple tenants;
    determine a priority weight for each asynchronous message of the plurality of asynchronous messages received based on a tenant associated with the asynchronous message and based on the execution demand of the plurality of asynchronous messages for the tenant of the message type associated with the asynchronous message;
    generate a decision whether to allow or to delay each asynchronous message of the plurality of asynchronous messages based on the priority weight determined for the asynchronous message;
    if the decision indicates to delay a particular asynchronous message of the plurality of asynchronous messages, deliver the particular asynchronous message to a delay buffer;
    if the decision indicates to allow the particular asynchronous message of the plurality of asynchronous messages, deliver the particular asynchronous message to an output buffer for the particular asynchronous message to wait its turn to be processed; and
    adjust the priority weight of each asynchronous message in the delay buffer based on delay information.

19. The non-transitory computer readable medium of claim 18, wherein the computer code further includes instructions for checking a current backlog status, determining a priority threshold based on the current backlog status, and moving the particular asynchronous message from the delayed buffer to the output buffer if the priority weight of the particular asynchronous message is not less than the priority threshold.

20. The non-transitory computer readable medium of claim 19, wherein the computer code further includes instructions for:
    moving the particular asynchronous message to a rejected buffer if the priority weight of the particular asynchronous message is less than the priority threshold by a rejection threshold value;
    checking an amount of message traffic for the tenant and message type of the particular asynchronous message;

updating the priority weigh of the particular asynchronous message if the amount of message traffic has changed; and moving the particular asynchronous message from the rejected buffer to the delay buffer if the updated priority weight has increased for the particular asynchronous message.

\* \* \* \* \*

UNITED STATES PATENT AND TRADEMARK OFFICE
CERTIFICATE OF CORRECTION

PATENT NO. : 10,148,738 B2
APPLICATION NO. : 14/936516
DATED : December 4, 2018
INVENTOR(S) : Margo Gagliardi et al.

It is certified that error appears in the above-identified patent and that said Letters Patent is hereby corrected as shown below:

In the Claims

Claim 20, Column 19, Line 1:
"updating the priority weigh of" should read - updating the priority weight of -.

Signed and Sealed this
Second Day of April, 2019

Andrei Iancu
*Director of the United States Patent and Trademark Office*